Figure 1:
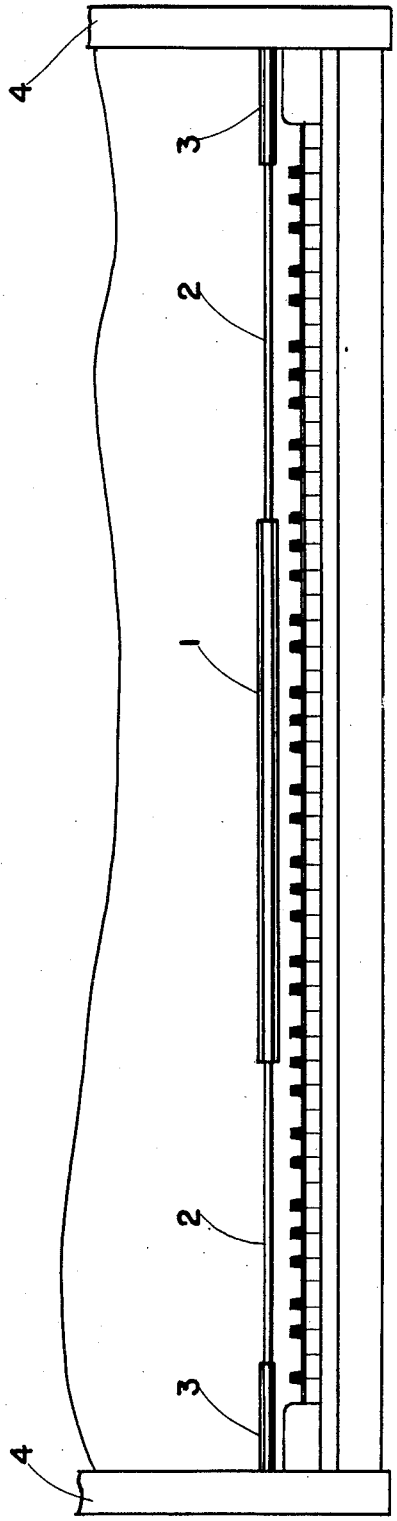

Aug. 1, 1950 W. J. QUEDNAU 2,517,026
CHORD INDICATOR AND TRANSPOSER
Filed Sept. 15, 1947 3 Sheets-Sheet 1

Inventor
Walter J. Quednau
By Stewart Blackman
Attorney

Inventor
Walter J. Quednau
By Stewart Blackman
Attorney

Aug. 1, 1950 W. J. QUEDNAU 2,517,026
CHORD INDICATOR AND TRANSPOSER
Filed Sept. 15, 1947 3 Sheets-Sheet 3
FIG. 8
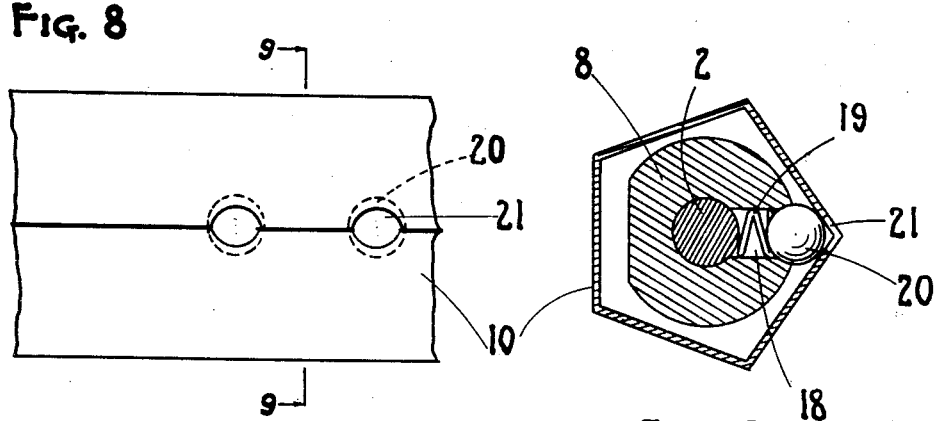
FIG. 9
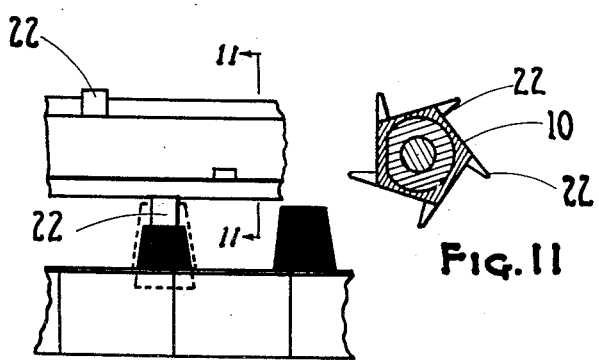
FIG. 10
FIG. 11
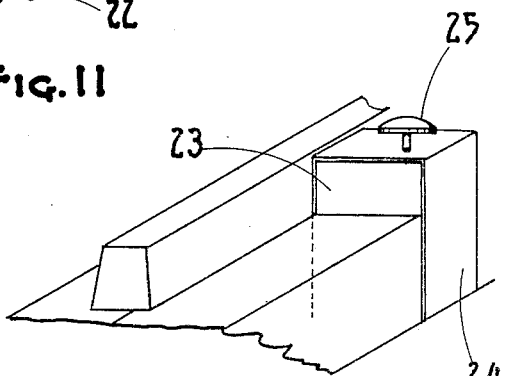
FIG. 12
Inventor
Walter J. Quednau
By Stewart Blackman
His Atty Patented Aug. 1, 1950

2,517,026

UNITED STATES PATENT OFFICE 2,517,026

CHORD INDICATOR AND TRANSPOSER

Walter J. Quednau, North Tonawanda, N. Y.

Application September 15, 1947, Serial No. 774,160

3 Claims. (Cl. 84—478)

The invention relates to improvements in piano teaching devices.

Devices of the type to which the invention has particular application are detachably mounted in association with a piano or like keyboard instrument, to assist the performer in mastering the instrument by directing him to the appropriate keys to be struck in producing chords of the requisite harmony. More particularly, the invention contemplates an improvement of the chord indicator described in my prior application, Serial No. 733,633, filed March 10, 1947, and now forfeited.

Prior piano teaching devices of which I am aware employ a scale plate or like indicator on which are inscribed the signatures or musical notations of the notes of the scale. The scale plate is normally positioned above the keyboard with the inscriptions thereon in registry with corresponding keys therebelow, and pointers of various descriptions are then manipulated into registry with predetermined combinations of signatures on the scale plate so as to point out corresponding key combinations to be struck in the production of the chord. The performer thus has before him an array of musical signatures only a small portion of which is of significance in the chord to be rendered, while the irrelevant symbols and indicia remain to confuse him in the selection and playing of the desired chords making up the accompaniment.

An object of the invention is to provide a chord indicator and transposer which may be readily interpreted by a relatively unskilled performer.

Another object is to provide a device of the character described which will be simple in operation and compact in assembly.

A further object is to provide a chord indicator which may be conveniently manipulated in response to the score being played.

Still another object is to provide a chord indicator and transposer which may be readily and economically manufactured.

Other advantages of the invention will be apparent as the description thereof proceeds.

According to the invention, the chord indicator and transposer has a multi-faced indicator body arranged above the keyboard, a common spindle and scale plate passed axially therethrough upon which the indicator is rotatable to disclose appropriate combinations of keys selectable therefrom, which are to be struck to produce chords in requisite harmony with the melody sought to be implemented.

Figure 2:
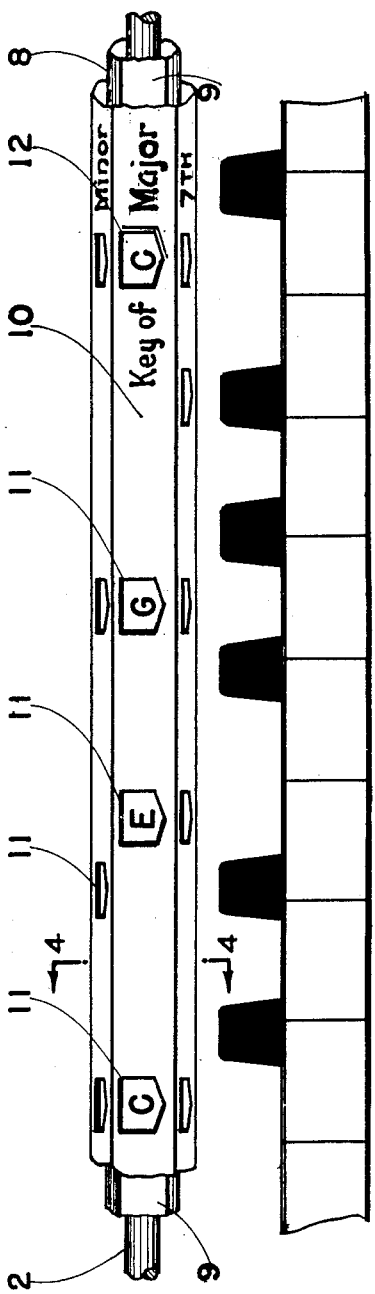
Figure 3:
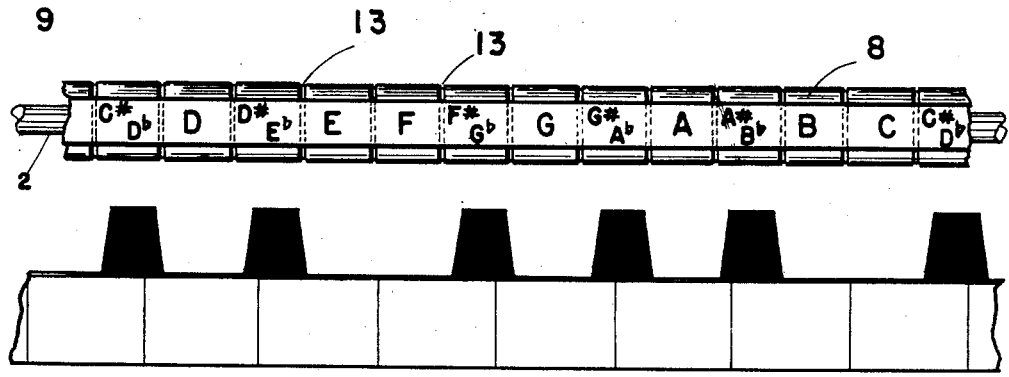
Figure 4:
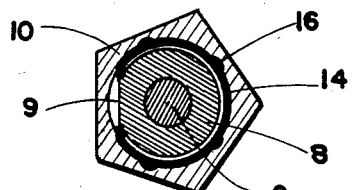
Figure 5:
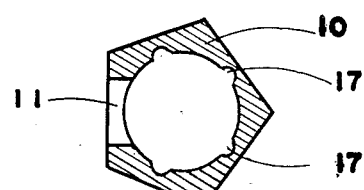
Figure 6:
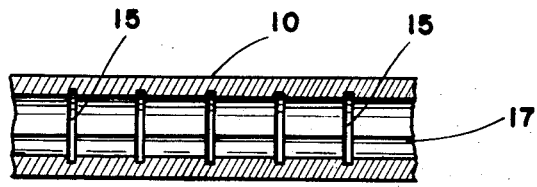
Figure 7:
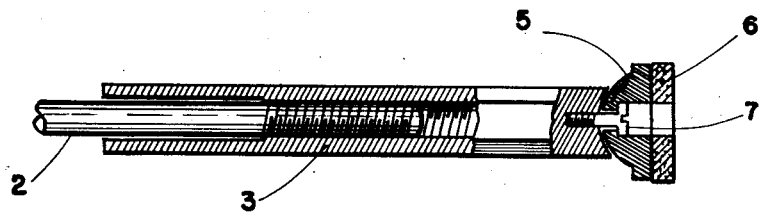

The invention is embodied in a chord indicator and transposer exemplified in the accompanying drawings in which the views are as follows:

Fig. 1, a front elevation of the chord indicator and transposer as applied to the keyboard of a piano;

Fig. 2, a partial elevation of the chord indicator and transposer shown in Fig. 1, extending substantially one octave in degree;

Fig. 3, an elevation of the scale plate in relation to the keyboard therebelow;

Fig. 4, a vertical section through the indicator taken on line 4—4, of Fig. 2;

Fig. 5, a vertical section through the indicator body with the scale plate spindle removed;

Fig. 6, a view, in partial detail, of the bore of the indicator body;

Fig. 7, a sectional detail of one of the bearing members for attaching the apparatus to a piano.

Fig. 8, a partial elevation of a modified form of the indicator body;

Fig. 9, a sectional detail through line 9—9 of Fig. 8;

Fig. 10, a fractional elevation of the indicator in a modified form thereof;

Fig. 11, a section through the indicator taken on line 11—11 of Fig. 10; and

Fig. 12, an isometric view of a filler attachment employable with a modification of the invention shown in Figs. 10 and 11.

The chord indicator and transposer, shown generally at 1 (Fig. 1), is carried on a shaft 2 extending horizontally of the piano keyboard and spaced upwardly therefrom at a convenient reading height.

The shaft terminates at each end thereof in a bearing member 3, extending in axial alinement therewith and adapted to bear against the inner face of the piano casing member 4 to support the apparatus in seating engagement therewith.

At their inner ends, the bearing members (Fig. 7), are bored and tapped axially thereof to telescopically receive the ends of the shaft 2 threaded thereinto.

At their outer ends, the bearing members terminate in a swivel seat 5 which has fitted thereto a pad 6, of cork, felt, rubber or like cushioning substance to prevent marring the surface finish of the casing members. The seat 5 is linked to the bearing member on a spindle 7 threaded thereinto in axial prolongation therewith and adapted to permit free rotation of the seat 5 relative to the bearing member.

Thus, the apparatus may be accommodated to pianos of various sizes by rotating the bearing members relative to the shaft 2 whereby to adjust the overall length of the device. The swivable seat 5 is adapted to remain substantially fixed to the casing member during the rotation of the bearing end of the shaft 2.

A set screw (not shown) may be threaded into the bearing members, in a manner conventional in the art, to engage the shaft 2 against accidental loosening thereof to prevent the inadvertent unseating of the apparatus.

The shaft (Fig. 3), is sleeved thereover by a tubular spindle 8 adapted for slideable axial movement and faced along the frontal surface thereof to provide a scale plate 9. The scale plate is inscribed with the signatures or musical notations of the keys of the scale, as C, C-sharp, D, D-sharp, E, F, and so on.

The signature inscriptions are spaced along the scale plate 9 at predetermined intervals such that, when superposed above the keyboard, each signature stands in registry with its corresponding key therebelow. When thus disposed, the scale plate 9 serves as a master scale whereby the apparatus may be positioned longitudinally of the keyboard in operative relation thereto.

Arranged on the spindle 8 (Fig. 2), for axial movement therealong, is a rotatable chord indicator 10, embodying an elongated prism forming a plurality of indicator faces, each of which is apertured to provide windows 11, 12. The windows are spaced apart in predetermined relationship along each face of the indicator to expose a combination of chord-forming signatures, thereby designating on the keyboard therebelow the corresponding combination of keys to be struck to render the desired chord.

The windows thus function as chord-designating symbols and, further, by disclosing the musical notations of the keys forming the chord, they serve to assist the relatively unskilled performer to identify the keys with their signature nomenclature.

Those signatures of the scale plate which do not occur in the chord to be struck remain concealed behind unapertured portions of the indicator face, thereby eliminating from the view of the performer a confusing array of symbols having no significance in the chord.

The window, or symbol, designating the tonic note of the scale, may be given a distinctive marking as at 12, to serve as an "Index," when brought into registry with the desired signature on the scale plate 9, to position the indicator 10 relative to the keyboard. As exemplified in Fig. 2, if the melody to be accompanied be written in the major key of C, the index window 12 is brought into registry with the signature C, normally the "middle" C, automatically superposing the windows 11 above the keys C, E, G, and C, which are thus designated to produce the desired chord.

When, as illustrated in Fig. 2, the indicator 10 is rotated so as to bring the face marked Minor fronting the scale plate 9, the windows will be seen to superpose the keys C, E-flat, G and C, to designate a minor chord in the key of C. It will be apparent that the indicator is shiftable to bring the index 12 to register with any signature of the scale and that the symbols 11 will, in consequence, be automatically superposed over the appropriate key combinations to render the desired chord.

It is the practice for publishers of popular music to place above the vocal staff a system of chord symbols or abbreviations, such as "C dim," "D aug," "C–7," and the like. These abbreviations are readable from a Table of Chords to define precise combinations of notes constituting the chords which they symbolize. It will be apparent that such chord combinations are translatable in terms of the window indicia to be apertured in the several faces of the indicator 10 to assist a performer in rendering the required chords.

To facilitate the registry of the windows in the indicator 10 with the signatures inscribed on the scale plate, the invention may include the positioning members shown in Figs. 4 to 6.

The spindle 8 is provided with circumferential grooves 13 (Fig. 3), spaced apart in predetermined intervals conforming to the spacing of the signatures.

The grooves 13 are adapted to receive wire clips 14, of suitable spring-like metal, which fit loosely about the spindle 8, but are clinched thereto by their ends lying in engagement with the top and bottom portions of the grooves along the top and bottom edges of the scale plate 9.

Thus, when the indicator body 10 is shifted along the scale plate, the wire clips 14 are adapted to yieldably engage corresponding interior grooves 15 formed along the bore of the indicator body, to position the indicator so that the windows therein will center, substantially, over a signature therebehind.

The clips 14 have formed about the periphery thereof, outwardly projecting beads 16 which are spaced circumferentially of the clips, and adapted for engagement with longitudinal grooves 17 formed along the bore of the indicator 10. Thus, when the indicator is rotated about the spindle 8, the beads 16 are adapted to yieldably hold the indicator so as to present the face thereof in frontal relation to the scale plate 9.

An indicator positioning means in modified form is shown in Figs. 8 and 9, wherein the spindle 8 has a radial bore 18 drilled at suitable intervals longitudinally thereof and disposed in predetermined angular relation to the scale plate 9. Arranged within the bore is a helical spring 19, adapted to bear outwardly against a ball 20, seated in the outer end of the bore. The ball is thus urged against the inner wall of the indicator body 10. Upon rotation of the indicator relative to the spindle 8, the ball is urged into engagement with one of the internal angles formed between adjacent sides of the indicator body, thereby holding the indicator in yieldably fixed position to insure the alinement of the selected indicator face in substantial parallelism with the scale plate 9 therebehind.

The indicator is likewise yieldably holdable in axial movement relative to the spindle, by the engagement of the ball 20 with one of a plurality of slots or notches 21, formed along the inner periphery of the indicator body at pre-determined intervals longitudinally thereof.

Thus, the spring-actuated ball 20 serves to yieldably position the indicator both in angular and axial movement in relation to the scale plate 9.

The indicator may alternatively be formed as shown in Fig. 5, the grooves 17 being adapted to receive the ball 20 to position the indicator in angular relation to the scale plate. In this construction, the grooves 17 may be further notched at suitable intervals longitudinally thereof so as to receive the ball to position the indicator in axial relation to the scale plate 9, as will be readily understood.

The chord indicator and transposer may include the peripheral cams described in my earlier application above referred to as a modification thereof, whereby the designated keys may be depressed to indicate the key combinations constituting the desired chords.

By this construction (Figs. 8 and 9), the indicator body is fitted along the faces thereof with peripheral cams 22 outwardly projecting therefrom and adapted, upon rotation of the indicator, to engage the keys constituting the chord to be produced. The cams are positioned in circumferential alinement with the appropriate windows 11 and in angular relation thereto so as to engage and depress those keys falling in registry with the windows then fronting the scale plate 9.

Thus, the performer may be further assisted in mastering the accompaniment by the suggestive effect induced when the chord-producing combination of keys is depressed before him simultaneously with the appearance of their musical notations on the scale plate thereabove.

To compensate for the difference in elevation between the top surfaces of the black and white keys, this form of the invention contemplates the employment of filler members 23 (Fig. 12), adapted to clamp over the white keys. The filler members may be of wood or other suitable material, held in place by clamps 24 formed of sheet material which may be that known in the art as "shim stock." An upstanding contact button 25 may be threaded into the top of the filler member to provide a vertically adjustable contact point for more positive engagement by the peripheral cams 22.

When installed in the region of the "fall board" of a piano instrument, where the top surfaces of the black and white keys are substantially flush, the filler members are omitted from this form of the invention as will be understood.

It will be seen that the invention provides a piano teaching device which is simple in operation and compact in form and assembly. Its construction lends itself to ready fabrication from plastic materials, the indicator body being formable from opaque plastic and the window portions thereof from transparent plastic, but the invention is not limited within the purview thereof to construction from any specific materials.

It will be understood that the scale plate and the indicator carried thereby may be extended to cover all or any portion of the keyboard, the indicator being limited in length only to permit the shifting thereof in relation to the scale plate to effect its adjustment thereto. Nor is the indicator limited to a specific number of faces nor to a prismatic body in cross-section. It may be cylindrical in form with the indicia faces thereof disposed longitudinally along its peripheral surface.

Of course, the invention is susceptible of various modifications without departing from the scope thereof, as hereinafter claimed.

I claim:

1. A chord indicator and transposer for the keyboard of a piano or like keyboard instrument, comprising a master scale bearing musical signature indicia for the registration thereof with said keyboard, a multi-faced chord indicator body sleeved about said master scale for slideable movement therealong and rotatable thereon, said indicator body having a plurality of windows in predetermined spaced relation along the faces thereof and shiftable relative to said master scale to position said windows in registry with chord-producing signatures of said indicia whereby to disclose said signatures to designate the keys of said keyboard corresponding to said chord-producing signatures, and means to operatively associate said master scale with said keyboard instrument.

2. A chord indicator and transposer for the keyboard of a piano or like keyboard instrument, comprising a master scale bearing musical signature indicia for the registration thereof with said keyboard, a multi-faced chord indicator body sleeved about said master scale for slideable movement therealong and rotatable thereon, said indicator body having a plurality of windows in predetermined spaced relation along the faces thereof and shiftable relative to said master scale to position said windows in registry with chord-producing signatures of said indicia whereby to disclose said signatures to designate the keys of said keyboard corresponding thereto, means to yieldably position said indicator body in angular and axial relation to said master scale to selectively effect registration of said windows with chord-producing signatures of said indicia, and means to operatively associate said master scale with said keyboard instrument.

3. A chord indicator and transposer for a piano keyboard, comprising a shaft terminating at each end thereof in adjustable bearing members adapted to support said shaft in bearing engagement with the side frame members of said piano, a common spindle and master scale sleeved upon said shaft and slideable therealong and bearing musical signature indicia along the front thereof for the registration of said master scale with said keyboard, a multi-faced chord indicator body rotatable upon said spindle and having a plurality of longitudinally spaced windows in predetermined relation along the several faces thereof, said indicator body being rotatable to position one of said faces to front said scale and shiftable to position the windows of said face in registry with chord-producing combinations of said signatures whereby to disclose said signatures to designate corresponding combinations of keys of said keyboard.

WALTER J. QUEDNAU.

REFERENCES CITED

The following references are of record in the file of this patent:

UNITED STATES PATENTS

| Number | Name | Date |
|---|---|---|
| 255,979 | Hauschel | Apr. 4, 1882 |
| 375,496 | Mason | Dec. 27, 1887 |
| 1,045,021 | Hartman | Nov. 19, 1912 |

FOREIGN PATENTS

| Number | Country | Date |
|---|---|---|
| 359,830 | Great Britain | Oct. 29, 1931 |